(12) United States Patent
Zeng et al.

(10) Patent No.: US 8,724,648 B2
(45) Date of Patent: May 13, 2014

(54) ENHANCED CONTROL SIGNALING FOR BACKHAUL LINK

(75) Inventors: Erlin Zeng, Beijing (CN); Haiming Wang, Beijing (CN); Jing Han, Beijing (CN)

(73) Assignee: Nokia Corporation, Espoo (FI)

( * ) Notice: Subject to any disclaimer, the term of this patent is extended or adjusted under 35 U.S.C. 154(b) by 393 days.

(21) Appl. No.: 12/570,165

(22) Filed: Sep. 30, 2009

(65) Prior Publication Data

US 2011/0075684 A1 Mar. 31, 2011

(51) Int. Cl.
*H04J 4/00* (2006.01)

(52) U.S. Cl.
USPC ............................ 370/436; 370/329; 370/330

(58) Field of Classification Search
USPC .......................................... 370/329, 330, 436
See application file for complete search history.

(56) References Cited

U.S. PATENT DOCUMENTS

| 8,457,674 | B2 | 6/2013 | Sandhu et al. ................. 455/522 |
| 2008/0310338 | A1 | 12/2008 | Charpenter et al. ........... 370/315 |
| 2009/0088148 | A1 | 4/2009 | Chung et al. ................... 455/423 |
| 2010/0195614 | A1* | 8/2010 | Nimbalker et al. ............ 370/330 |
| 2010/0275083 | A1* | 10/2010 | Nam et al. ...................... 714/748 |
| 2010/0281323 | A1* | 11/2010 | Wang et al. ..................... 714/748 |
| 2011/0194412 | A1* | 8/2011 | Park et al. ....................... 370/241 |

FOREIGN PATENT DOCUMENTS

| CN | 101517980 A | 8/2009 |
| EP | 2 086 145 A2 | 8/2009 |
| WO | WO 2008/127015 A1 | 10/2008 |
| WO | WO 2009/041785 | 4/2009 |

OTHER PUBLICATIONS

"Considerations on Multiple HARQs in Type I Backhaul Link Transmission", Samsung, 3GPP TSG RAN WG1 Meeting #58, R1-093388, Aug. 2009, 2 pgs.

"Number of MAC PDUs for Relay Operation", LG Electronics Inc., 3GPP TSG-RAN WG2 #67, R2-094637, Aug. 2009, 2 pgs.

"3rd Generation Partnership Project; Technical Specification Group Radio Access Network; Further Advancements for E-UTRA Physical Layer Aspects (Release 9)", 3GPP TR 36.814 V1.2.1 Jun. 2009, 45 pgs.

3rd Generation Partnership Project; Technical Specification Group Radio Access Network; Evolved Universal Terrestrial Radio Access (E-UTRA; Multiplexing and channel coding (Release 8), 3GPP TS 36.212 V8.6.0, Mar. 2009, 59 pgs.

Nokia Siemens Networks et al.; "Further Aspects of Control Channel for Relay Backhaul link"; R1-092565; 3GPP TSG RAN WG1 Meeting #57bis, Los Angeles, US; Jun. 29-Jul. 3, 2009; whole document (3 pages).

LG Electronics; "Consideration on Resource Allocation for Relay Backhaul Link"; R1-090790; 3GPP TSG RAN WG1 Meeting #56, Athens, Greece; Feb. 9-13, 2009; whole document (5 pages).

* cited by examiner

*Primary Examiner* — Jason Mattis
(74) *Attorney, Agent, or Firm* — Harrington & Smith

(57) ABSTRACT

A method includes composing downlink control information having a format configured to support a presence of a plurality of transport blocks in a single subframe, where the downlink control information comprises, for the plurality of transport blocks, a common resource allocation and modulation/coding scheme field and a single cyclic redundancy check field. The method further includes transmitting the composed downlink control information to a relay node over a wireless link that comprises a backhaul link from the relay node.

17 Claims, 7 Drawing Sheets

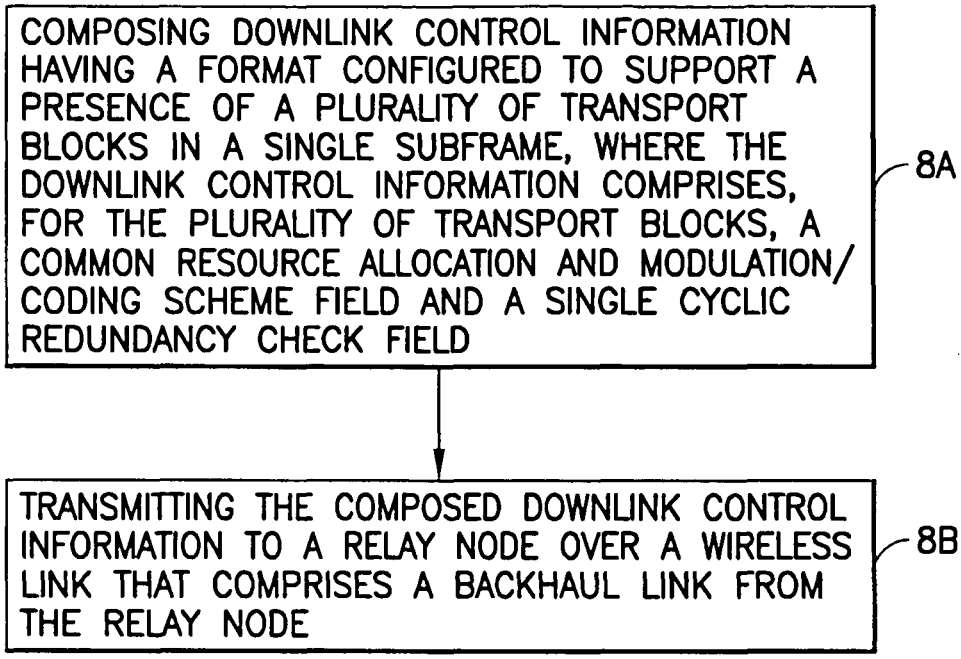

ENHANCED CONTROL SIGNALING FOR BACKHAUL LINK

TECHNICAL FIELD

The exemplary and non-limiting embodiments of this invention relate generally to wireless communication systems, methods, devices and computer programs and, more specifically, relate to the use of a relay node between a network access node, such as an eNB or a DeNB, and a user device or user equipment (UE).

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| ACK | acknowledge |
| DCI | downlink control information |
| DL | downlink (eNB towards UE via RN) |
| eNB | EUTRAN Node B (evolved Node B) |
| EPC | evolved packet core |
| EUTRAN | evolved UTRAN (LTE) |
| CDM | code division multiplexing |
| CRC | cyclic redundancy check |
| CQI | channel quality indicator |
| DeNB | donor eNB |
| HARQ | hybrid adaptive repeat request |
| LTE | long term evolution |
| MAC | medium access control |
| MCS | modulation and coding scheme |
| MM/MME | mobility management/mobility management entity |
| NACK | not acknowledge/negative acknowledge |
| NDI | new data indicator |
| Node B | base station |
| OFDMA | orthogonal frequency division multiple access |
| O&M | operations and maintenance |
| PDCP | packet data convergence protocol |
| PDCCH | physical downlink control channel |
| PDSCH | physical downlink shared channel |
| PDU | protocol data unit |
| PHY | physical |
| PRB | physical resource block |
| RB | radio bearer |
| RLC | radio link control |
| RN | relay node |
| RRC | radio resource control |
| RRM | radio resource management |
| R-PDCCH | relay link (backhaul link) physical downlink control channel |
| R-PDSCH | relay link physical downlink shared channel |
| RV | redundancy version |
| SGW | serving gateway |
| SC-FDMA | single carrier, frequency division multiple access |
| TB | transport block |
| TTI | transmission time interval |
| UE | user equipment |
| UL | uplink (UE towards eNB via RN) |
| UTRAN | universal terrestrial radio access network |

The specification of a communication system known as evolved UTRAN (EUTRAN, also referred to as UTRAN-LTE or as EUTRA) is currently nearing completion within the 3GPP. As specified the DL access technique is OFDMA, and the UL access technique is SC-FDMA.

One specification of interest is 3GPP TS 36.300, V8.7.0 (2008-12), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety. This system may be referred to for convenience as LTE Rel-8, or simply as Rel-8. In general, the set of specifications given generally as 3GPP TS 36.xyz (e.g., 36.211, 36.311, 36.312, etc.) may be seen as describing the entire Release 8 LTE system.

FIG. 6 reproduces FIG. 4.1 of 3GPP TS 36.300, and shows the overall architecture of the EUTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);
IP header compression and encryption of the user data stream; selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configurations to provide mobility and scheduling.

Of particular interest herein are the further releases of 3GPP LTE targeted towards future IMT-A systems, referred to herein for convenience simply as LTE-Advanced (LTE-A). Reference can be made to 3GPP TR 36.814, V1.2.1 (2009-06), 3rd Generation Partnership Project; Technical Specification Group Radio Access Network; Further Advancements for E-UTRA Physical Layer Aspects (Release 9), incorporated by reference herein in its entirety.

A goal of LTE-A is to provide significantly enhanced services by means of higher data rates and lower latency with reduced cost. Current progress in 3GPP Ran-1 has shown that a Type-1 RN will be included in LTE Rel-10.

More specifically, section 9 of 3GPP TR 36.814, V1.2.1 states that relaying is considered for LTE-Advanced as a tool to improve, e.g., the coverage of high data rates, group mobility, temporary network deployment, the cell-edge throughput and/or to provide coverage in new areas.

The relay node is wirelessly connected to the radio access network via a donor cell. The connection can be inband, in which case the network-to-relay link share the same band with direct network-to-UE links within the donor cell. Rel-8 UEs should be able to connect to the donor cell in this case. The connection could also be outband, in which case the network-to-relay link does not operate in the same band as direct network-to-UE links within the donor cell.

With respect to the knowledge in the UE, relays can be classified as transparent, in which case the UE is not aware of whether or not it communicates with the network via the relay, or as non-transparent, in which case the UE is aware of whether or not it is communicating with the network via the relay.

Depending on the relaying strategy, a relay may be part of the donor cell, or control cells of its own. In the case the relay is part of the donor cell, the relay does not have a cell identity of its own (but may still have a relay ID). At least part of the RRM is controlled by the eNB to which the donor cell belongs, while parts of the RRM may be located in the relay. In this case, a relay should preferably also support LTE Rel-8 UEs. Smart repeaters, decode-and-forward relays and different types of L2 relays are examples of this type of relaying.

In the case where the relay is in control of cells of its own, the relay controls one or several cells and a unique physical layer cell identity is provided in each of the cells controlled by the relay. The same RRM mechanisms are available, and from a UE perspective there is no difference in accessing cells controlled by a relay and cells controlled by a "normal" eNB. The cells controlled by the relay should support also LTE Rel-8 UEs. Self-backhauling (L3 relay) and "type 1 relay nodes" use this type of relaying.

3GPP TR 36.814, V1.2.1 also states that at least "Type 1" relay nodes are part of LTE-Advanced. A "type 1" relay node is an inband relaying node characterized by the following: it control cells, each of which appears to a UE as a separate cell distinct from the donor cell; the cells shall have their own Physical Cell ID (defined in LTE Rel-8) and the relay node shall transmit its own synchronization channels and reference symbols, etc. In addition, in the context of single cell operation the UE shall receive scheduling information and HARQ feedback directly from the relay node and send its control channels (SR/CQI/ACK) to the relay node. In addition, the relay node shall appear as a Rel-8 eNB to Rel-8 UEs (i.e., it is fully backwards compatible with Rel-8 UEs. Further, to LTE-Advanced UEs it should be possible for a type 1 relay node to appear differently than Rel-8 eNodeB to allow for further performance enhancements.

As was noted above, it is already assumed in 3GPP TR 36.814, V1.2.1 that a wireless DL backhaul (i.e., the link from the DeNB to the RN) will be implemented in a Rel-8 backwards compatible fashion. This is accomplished by configuring a MBSFN subframe in the RN cell. One difference between the backhaul link and a normal link, i.e., that between the DeNB and a macro cell UE, is that for the former the data traffic for multiple UEs under the RN cell is aggregated. By reusing LTE Rel-8 mechanism, data traffic of different QoS types will be bundled over the backhaul link to form a transport block (i.e., a TB). As a result, the physical layer can handle the TB by using Rel-8 procedures, which implies one R-PDCCH channel for granting the resources, and one ACK/NACK feedback in the UL. This approach, however, suffers from a lack of efficiency as identified in R2-094637, 24-29 Aug. 2009, 3GPP TSG-RAN WG2 #67, "Number of MAC PDUs for Relay Operation", LG Electronics Inc., since the traffic of different QoS type will have to be treated equally in terms of scheduling and HARQ operations.

It has been proposed that the backhaul can possibly support multiple TBs in a single subframe (R1-093388, 24-28 Aug. 2009, 3GPP TSG-RAN WG1 Meeting #58, "Considerations on Multiple HARQs in Type I Backhaul Link Transmission", Samsung. One possible benefit is that the traffic of different QoS types can be embedded into different TBs and thus treated accordingly.

SUMMARY

The foregoing and other problems are overcome, and other advantages are realized, by the use of the exemplary embodiments of this invention.

In a first aspect thereof the exemplary embodiments of this invention provide a method that comprises composing downlink control information having a format configured to support a presence of a plurality of transport blocks in a single subframe, where the downlink control information comprises, for the plurality of transport blocks, a common resource allocation and modulation/coding scheme field and a single cyclic redundancy check field. The method further includes transmitting the composed downlink control information to a relay node over a wireless link that comprises a backhaul link from the relay node.

In another aspect thereof the exemplary embodiments of this invention provide an apparatus that comprises a processor and a memory including computer program code. The memory and computer program code are configured to, with the processor, cause the apparatus at least to perform: composing downlink control information having a format configured to support a presence of a plurality of transport blocks in a single subframe, where the downlink control information comprises, for the plurality of transport blocks, a common resource allocation and modulation/coding scheme field and a single cyclic redundancy check field; and transmitting the composed downlink control information to a relay node over a wireless link that comprises a backhaul link from the relay node.

In another aspect thereof the exemplary embodiments of this invention provide a method that comprises receiving at a relay node downlink control information having a format configured to support a presence of a plurality of transport blocks in a single subframe, where the downlink control information comprises, for the plurality of transport blocks, a common resource allocation and modulation/coding scheme field and a single cyclic redundancy check field. The method further includes interpreting at the relay node the received downlink control information for use in transmitting at least user equipment data to a network access node over a backhaul wireless link.

BRIEF DESCRIPTION OF THE DRAWINGS

In the attached Drawing Figures:

FIGS. 8 and 9 are each a logic flow diagram that illustrates the operation of a method, and a result of execution of computer program instructions embodied on a computer readable medium, in accordance with the exemplary embodiments of this invention.

DETAILED DESCRIPTION

An aspect of the exemplary embodiments of this invention is identifying the control signaling overhead issue of multiple-TB transmissions over the backhaul link, and a novel control signaling design is provided to reduce the overhead.

This signaling design is tailored for multiple-TB transmission on the backhaul, while it is flexible for fallback to single TB cases via certain semi-static configurations. A further aspect of the exemplary embodiments of this invention is an UL ACK/NACK feedback signaling design that addresses and solves the multiple R-PDCCH missing issue for the cases where one R-PDCCH channel is presented per each TB.

Figure 7:
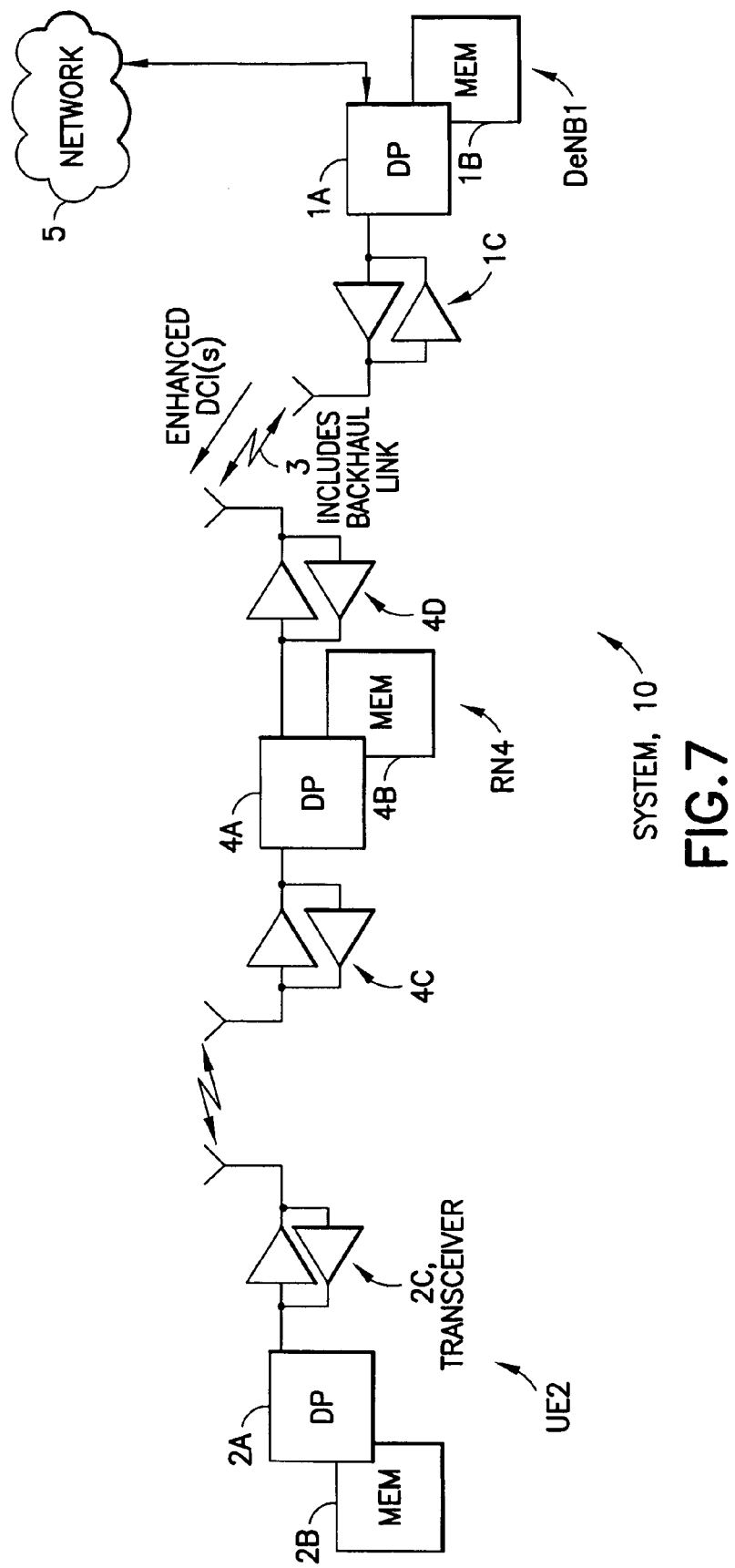
FIG. 7 shows a simplified block diagram of various electronic devices that are suitable for use in practicing the exemplary embodiments of this invention.

Before describing in further detail the exemplary embodiments of this invention, reference is made to FIG. 7 for illustrating a simplified block diagram of various electronic devices that are suitable for use in practicing the exemplary embodiments of this invention that have been described above. In FIG. 7 a wireless communication system 10 implements a relay-based network and includes at least one user equipment (UE) 2, at least one relay node (RN) 4 and at least one access point or base station, referred to herein as a DeNB 1. The UE 2 and DeNB 1 each include a suitable controller, such as a data processor (DP) 2A, 1A, operatively coupled with a memory (MEM) 2B, 1B, respectively. The DeNB 1 can be coupled to a network 5, such as a local area network and/or a wide area network (such as the Internet) which can contain, for example, a source of content that is broadcast or multicast to a plurality of UEs 2. Each of the UE 2 and DeNB 1 includes at least one wireless (e.g., radio frequency) transceiver 2C, 1C, respectively, with at least one associated antenna. The at least one RN 4 is assumed to be similarly constructed, and may include a DP 4A and associated MEM 4B, and is adapted for communication with the UE 2 and the DeNB 1 with at least one or two, as shown, wireless transceivers 4C, 4D. The wireless link 3 between the RN 4 and the DeNB 1 includes the backhaul link (in the UL direction from the RN 4 to DeNB 1).

The memories 1B and 4B are assumed to include computer program instructions, executable by the associated data processors 1A and 4A, respectively, for operation in accordance with the exemplary embodiments of this invention. In general, the program instructions executable by the DP 4A and the DP 1A operate the illustrated RN 4 and DeNB 1 to implement the improved backhauling technique as described in detail below.

The exemplary embodiments of this invention may be implemented at least in part by computer software executable by the DPs 1A, 4A, or by hardware, or by a combination of software and hardware (and firmware).

In general, the various embodiments of the UE 2 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable devices, units and terminals that incorporate combinations of such functions.

The MEMS 2B, TB and 4B, which may be generally considered to be computer-readable memory medium that store computer program code as well as related data, may be of any type suitable to the local technical environment and may be implemented using any suitable data storage technology, such as semiconductor-based memory devices, flash memory, magnetic memory devices and systems, optical memory devices and systems, fixed memory and removable memory. The DPs 2A, 1A and 4A may be of any type suitable to the local technical environment, and may include one or more of general purpose computers, special purpose computers, microprocessors, digital signal processors (DSPs) and processors based on multi-core processor architectures, as non-limiting examples.

Figure 1:
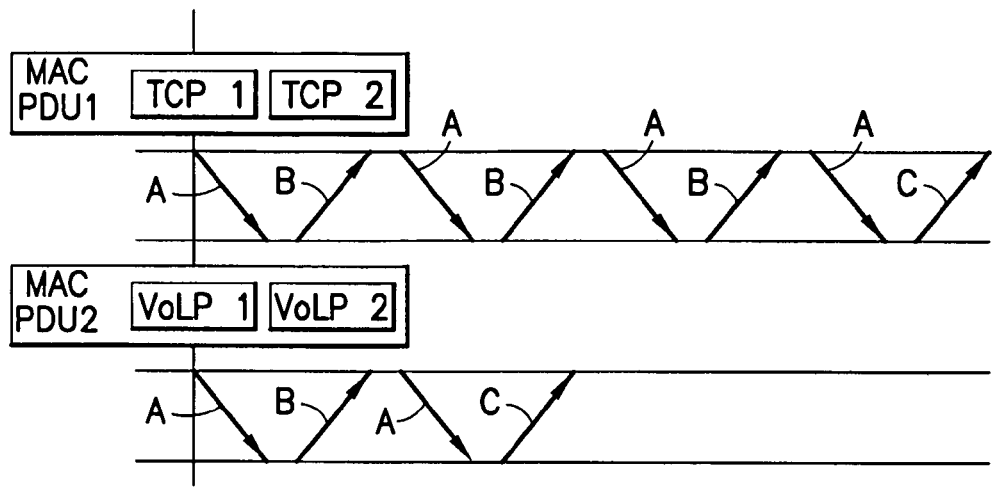
FIG. 1 illustrates traffic of different QoS type from multiple TBs over a backhaul.

In order to place the exemplary embodiments of this invention in a proper technological context, reference is made to FIG. 1 which illustrates an example of traffic of different QoS types from multiple TBs over the backhaul link 3. In this non-limiting example two separate MAC PDUs (i.e., PDU 1 and PDU 2) are composed and delivered with a separate QoS parameter. In FIG. 1 the arrows 'A' denote the first transmission from transmitter to receiver, while the arrows 'B' and arrows 'C' denote NACK feedback and ACK feedback, respectively. It is shown in FIG. 1 that the PDU 1, which contains TCP traffic, may support a larger number of retransmissions, while PDU 2 which contains more delay sensitive VoIP (voice over internet protocol) traffic has a smaller number of retransmissions. Thus, VoIP data and TCP data can be transmitted separately using optimized physical settings. Based on such procedure, the scheduler and HARQ functionality can handle these TBs separately to increase efficiency.

A straightforward technique in this case is that DeNB 1 configures one R-PDCCH (for DL grant) for each of the TBs, which means the resources for these TBs are granted separately. For 'one R-PDCCH per TB' cases one can see that there is an efficiency issue that arises due to the high control overhead.

Figure 2A:
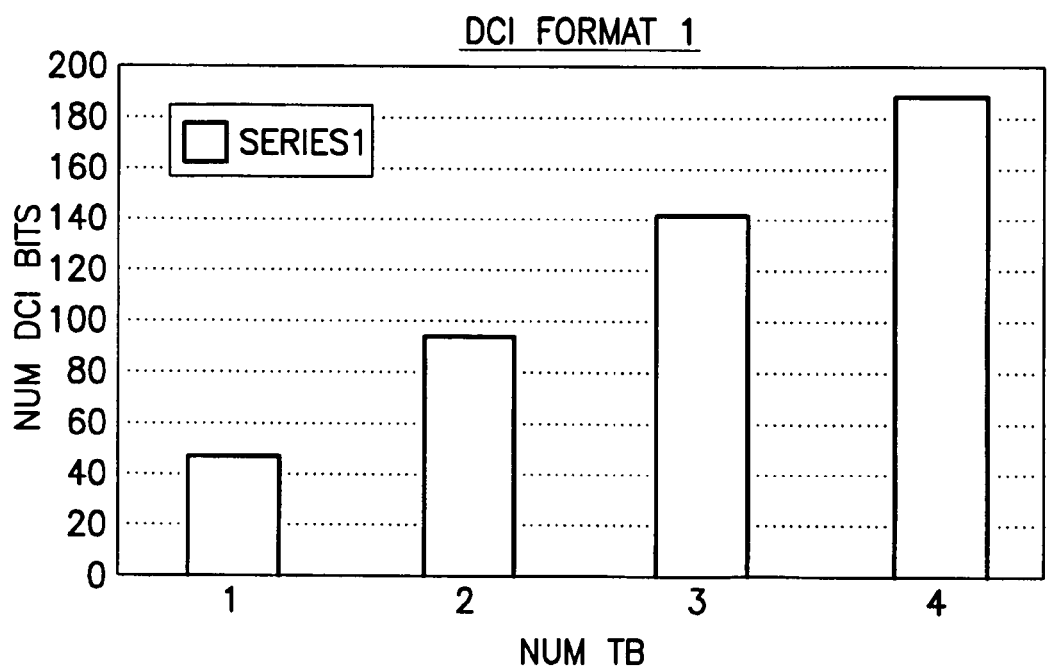
FIG. 2 illustrates an increase in control overhead with the number of TBs over the backhaul.
Figure 2B:
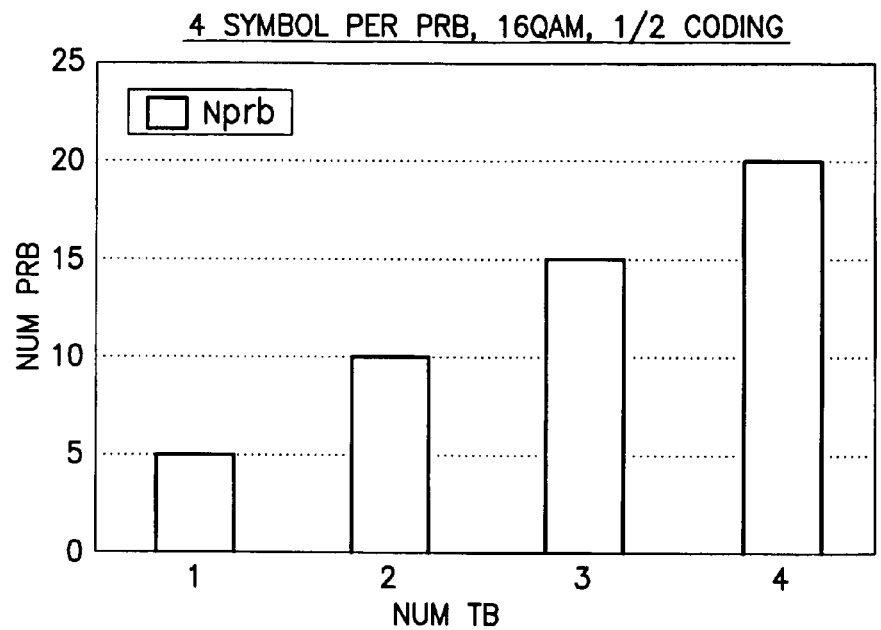

In FIG. 2A it is shown that the number of DCI bits increases linearly with the number of TBs over the backhaul for DCI format 1. From FIG. 2B it can be seen that the frequency resources occupied by R-PDCCHs increase with the TB number, assuming an exemplary case of four symbols per PRB used for the R-PDCCHs.

Furthermore, there exists a "missing" R-PDCCH issue as the number of control channels increases. For example, assuming a missing probability P_m=0.01 per each R-PDCCH, and four TBs transmitted in a single subframe, the probability of not losing any R-PDCCH will be only about 0.96. As such, the UL ACK/NACK signaling should be designed to accommodate this increased R-PDCCH missing probability.

Figure 3:
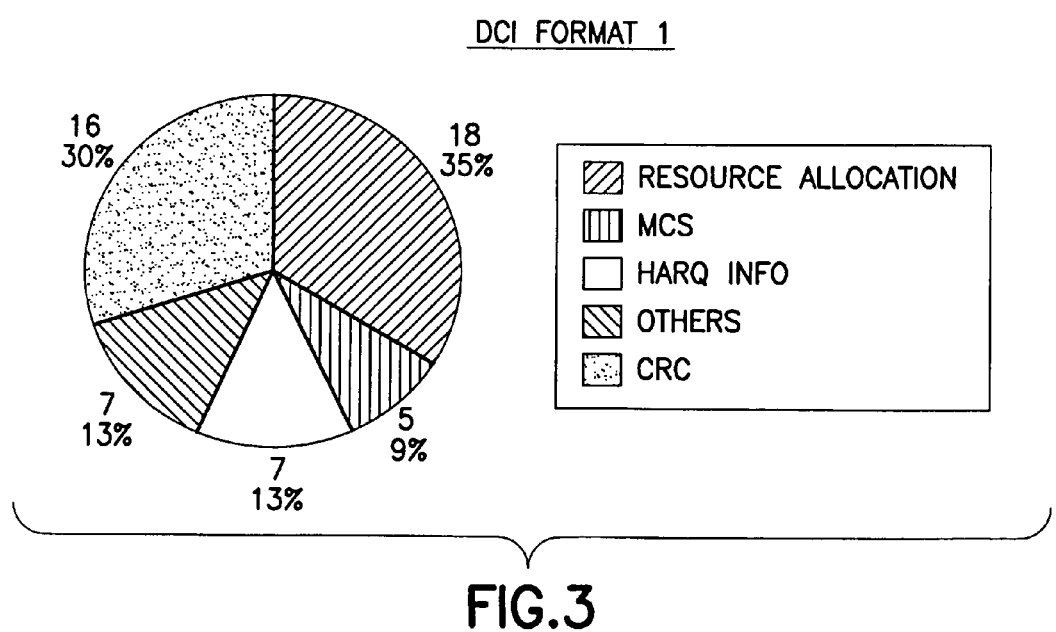
FIG. 3 is an example of a Rel-8 DCI format 1.

As another example, the Rel-8 DL control information (DCI) format 1 is shown in FIG. 3. It can be seen that the resource allocation field, plus the CRC portion, account for approximately 65% of the total control bits. Thus, to reduce the backhaul control overhead, these two fields should be reduced/compressed.

In the above-mentioned R2-094637, the need for supported multiple TBs over the backhaul was indicated. In the above-mentioned R1-093388 it was proposed that multiple HARQ processes be transmitted in one subframe, while each HARQ process can have similar procedure and control information as in the LTE Rel-8 system. However, in these proposals certain issues, such as control overhead and the "missing" R-PDCCH problem, are not considered.

In accordance with the exemplary embodiments of this invention there is provided an enhanced DCI that is configured to reduce backhaul control overhead for supporting multiple TBs over the backhaul. Further in accordance with the exemplary embodiments of this invention there is provided a mechanism for the semi-static configuration of the TB number over the backhaul link. Also provided is a technique to accommodate and solve the R-PDCCH missing issue for the case of one R-PDCCH per TB.

With regard to the enhanced DCI to reduce backhaul link control overhead, the DeNB 1 indicates to the RN 4 by higher layer signaling (e.g., Layer 3 (L3), RRC signaling) a TB number (N_TB), or a maximum possible value of N_Max in each subframe during a period of time.

The DCI format is enhanced to support multiple TBs with a single R-PDCCH. In this embodiment at least CRC and resource allocation/MCS fields for the TBs are shared. That is, only one CRC field is attached to (included in) the DCI bits. Further, one common resource allocation/MCS filed is included in the DCI, and one resource/MCS offset per each TB are included in DCI. Further in accordance with this exemplary embodiment, the RN 4 knows exactly how many, and which resources are allocated to each TB based on the above-described common and TB-specific fields. In addition, the RN 4 knows explicitly the MCS for each TB, if common and TB-specific MCS fields are presented, or the RN knows implicitly the MCS for each TB via common and TB-specific resource allocation fields if the common and TB-specific MCS fields are absent.

Furthermore, the content of the enhanced DCI format assumes a TB number N_TB or a maximum TB number N_Max configured via a higher layer, and thus avoids a need for excessive RN 4 R-PDCCH searching complexity.

Furthermore, the number of the TB, i.e., N_TB, is implicitly indicated by the TB-specific fields, or is explicitly indicated by a TB number filed in the DCI.

With regard now to semi-static TB number configuration, the DeNB 1 configures via semi-static higher layer signaling the maximum TB number in a period of time, e.g., N_Max. The maximum possible value of N_Max may be predefined and known a priori by both the DeNB 1 and the RN 4. Alternatively, the specific number of TBs in a period of time, N_TB, can be used, and the maximum possible value of N_TB may be predefined and known a priori by both the DeNB 1 and the RN 4.

The DeNB 1 configures, via semi-static higher layer signaling, which R-PDCCH format the RN 4 shall monitor, e.g., the case of a DCI supporting multiple TBs or the case of one R-PDCCH per TB. Preferably the RN 4 only monitors the configured DCI format to reduce the R-PDCCH searching complexity.

With regard now to the handling of the missing R-PDCCH issue, the DeNB 1 indicates to the RN 4 by higher layer signaling the TB number N_TB, or the maximum possible number N_Max of TBs in each subframe during a period of time. The DeNB transmits one R-PDCCH for per each TB in one subframe. The RN 4 detects the R-PDCCHs and indicates using UL ACK/NACK signaling for each TB whether: a) the R-PDCCH was missed (i.e., not received), b) the R-PDCCH received, R-PDSCH ACK, or c) the R-PDCCH was received, R-PDSCH NACK. The RN 4 forms the ACK/NACK signaling according the N_TB or N_Max signaled by the DeNB 1, as explained in further detail below. By receiving the UL feedback from the RN 4, the DeNB 1 knows how many, and which, R-PDCCHs were received or missed by the RN 4.

The foregoing exemplary embodiments of this invention are now described in further detail.

For the case of multiple TBs over the backhaul link 3, in the LTE Rel-8 MAC layer traffic data with different QoS levels may be multiplexed into one MAC PDU through the Scheduling/Priority Handling sub-layer and the Multiplexing sub-layer. Thus, traffic data with different QoS levels will experience the same QoS handling in the PHY layer, e.g., the same retransmission times and same delay limit. This will tend to decrease the transmission efficiency, but it is not a severe problem for the Rel-8 UE because of the limited data and infrequent multiplexing. However this is not the case for the backhaul link 3, since the traffic is for all of the UEs 2 that are connected to the RN 4 (which could potentially be a large number). In addition, the time domain resource for the backhaul link is valuable, and there is a highly probability that multiple QoS level traffic will be transmitted in the same TTI. Using different QoS handling for different QoS traffic in backhaul link 3 is important to increase the transmission efficiency, even without the presence of multiple carriers or multiple streams.

For example, in the uplink the DeNB 1 schedules the resources and MCS for multiple QoS traffic according to a buffer report received from the RN 4. Then, in the UL backhaul subframe the RN 4 will prepare multiple MAC PDUs according to the scheduling information. For each MAC PDU, the RN 4 could, for example, multiplex the traffic with the same QoS level to increase the transmission efficiency. Then multiple MAC PDUs or transport blocks (TBs) will experience separate PHY layer processing and be transmitted on the PHY layer simultaneously in the same TTI.

The scheduling information is indicated by DeNB 1 through the downlink control channel. Thus, this downlink control information (DCI) format for multiple TBs is different from that of single TB in Rel-8 (without multiple streams). In the following, the detailed design of the DCI format for backhaul link with multiple TBs is explained.

General reference with regard to DCI, as defined for LTE Rel-8, can be made to 3GPP TS 36.212 V8.6.0 (2009-03) Technical Specification 3rd Generation Partnership Project; Technical Specification Group Radio Access Network; Evolved Universal Terrestrial Radio Access (E-UTRA); Multiplexing and channel coding (Release 8), in particular Section 5.3.3, Downlink Control Information, and Section 5.3.3.1, DCI formats (including DCI format 0, DCI format 1, DCI format 2, etc.)

Figure 4:
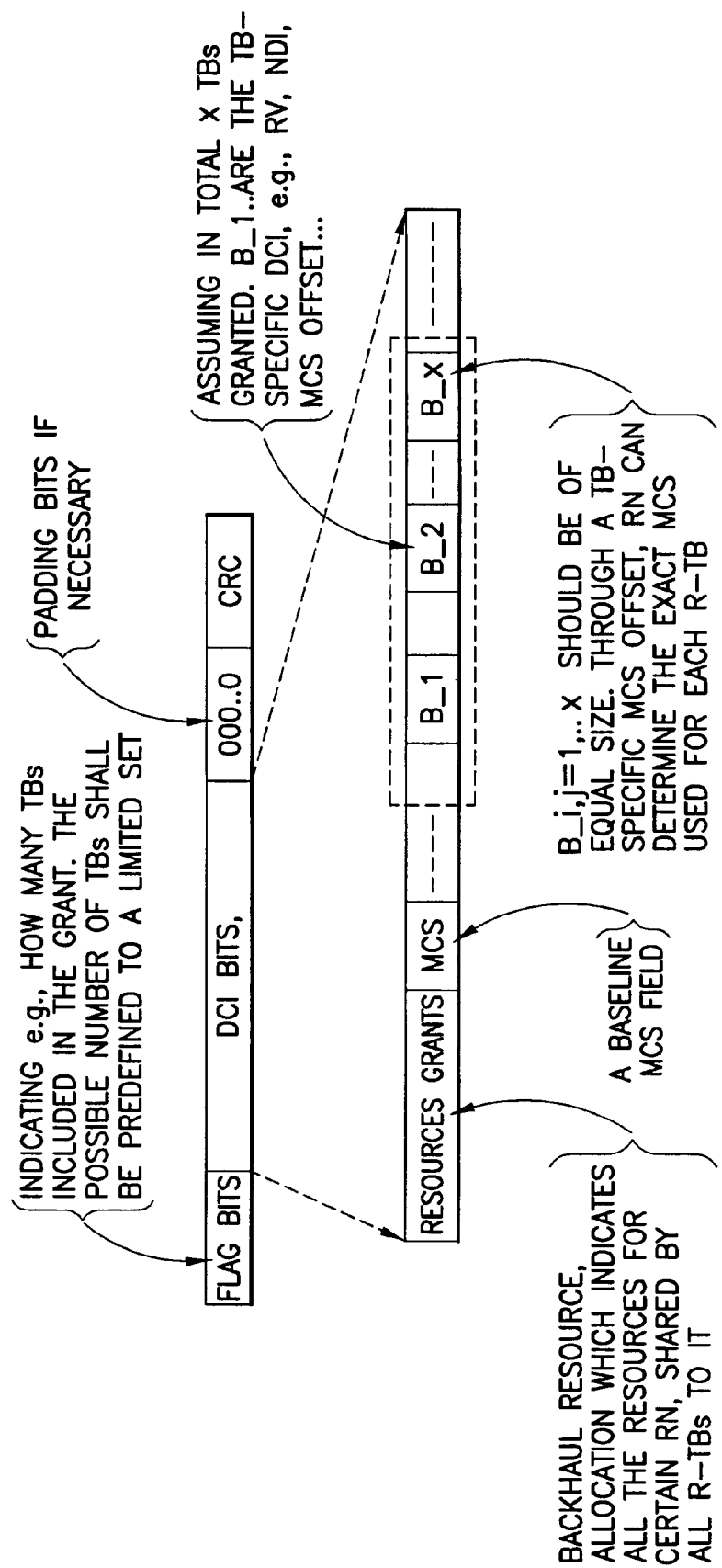
FIG. 4 depicts an example of a DCI format in accordance with exemplary embodiments of this invention.

The enhanced DCI format for supporting multiple TBs in a single subframe includes features such as multiple TBs share the resource allocation/MCS field, and only one CRC field in the DCI. FIG. 4 shows an example of the enhanced DCI format in accordance with the exemplary embodiments of this invention.

In the example of FIG. 4 the DCI includes a flag bits field is included to indicate N_TB (the number of TBs included in the grant). The maximum possible number of TBs can be predefined to a limited set. Note that this information can also be implicitly carried by, e.g., a TB-specific field. One simple example is that if a certain TB is not present in the subframe, the TB-specific field is filled with all zero bits (or other predefined bits) to inform the RN 4 of the exact number of TBs.

The DCI further includes a common resource grants field that may contain a bitmap to show which PRB or PRB sets will be allocated for the RN 4. For example, one may denote these allocated resources as R.

The DCI may further include a baseline MCS field to indicate the modulation level and the coding scheme chosen for the RN 4 in the subframe.

The DCI further includes TB-specific fields, e.g., B_1, B_2, . . . , B_x, which can include HARQ information for each TB, and also a resource/MCS offset for each TB. Based on the offset value, the RN 4 determines which part of the resources among R is allocated for each TB. The HARQ information may include, for example, the RV, NDI and HARQ process number.

The number of TBs, i.e., x, supported by the DCI is configured by the DeNB 1 via higher layer signaling to avoid excess RN 4 R-PDCCH searching complexity. For example, x is set to N_Max if the maximum number of TBs in a period of time is configured via higher layer signaling, while x is equal to N_TB if the exact number of TBs in a period of time is configured via higher layer signaling. For the latter case the control overhead may be less, while certain scheduling constraints may be introduced. For the former case, the exact number of TBs can be any integer between 1 and N_Max. In this case the RN 4 will have knowledge of the exact number of TBs either via the TB number field or through decoding a TB specific field which implicitly indicates the presence of certain TB(s).

Padding bits can be inserted in the DCI if necessary, and a CRC field is attached to the DCI for error detection.

Figure 5:
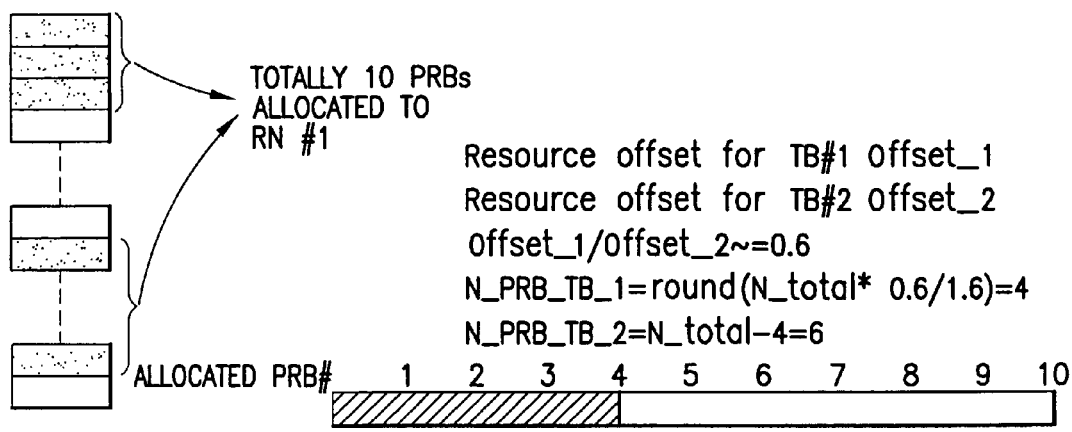
FIG. 5 is an example of a RN determining a resource and MCS via common and RN-specific fields.
Figure 6:
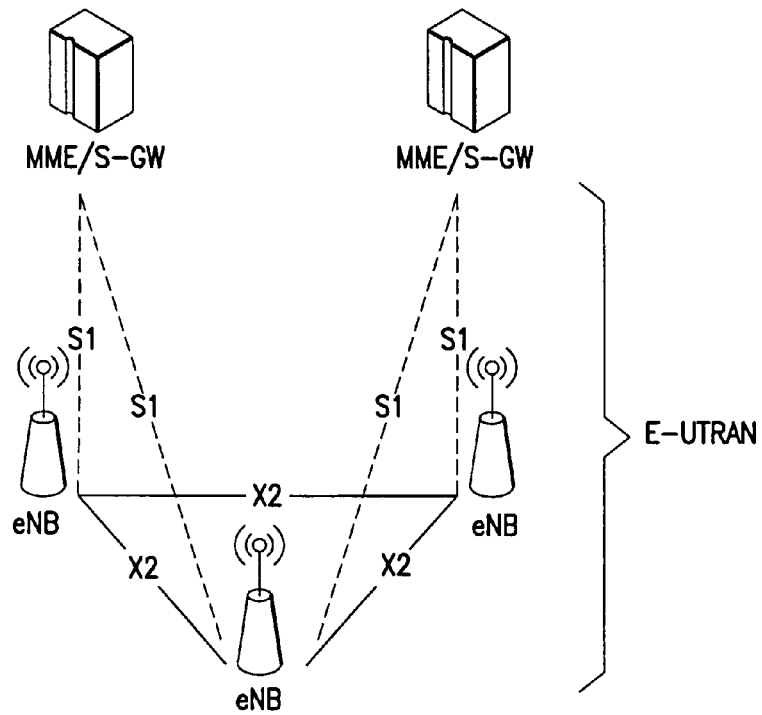
FIG. 6 reproduces FIG. 4.1 of 3GPP TS 36.300, and shows the overall architecture of the EUTRAN system.
Figure 6:
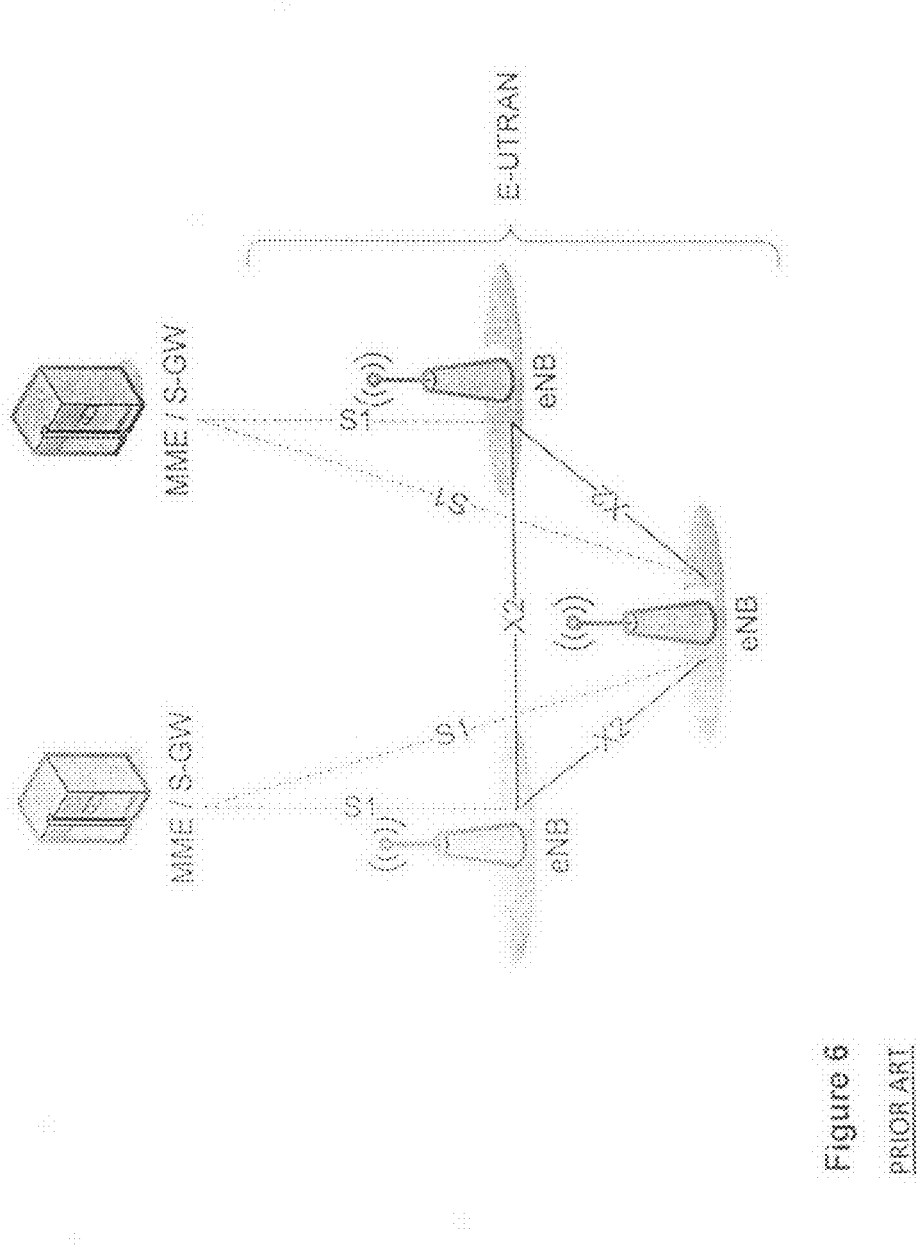

FIG. 5 presents a non-limiting example of the RN 4 determining a resource and MCS via common and RN-specific fields. The common resource fields show that in total 10 PRBs are allocated to a RN #1, and a common MCS field indicates, for example, that the modulation is 16QAM and the coding scheme is ⅓ Turbo coding. By decoding TB-specific fields, the RN 4 knows that 4 PRBs are for TB #1, and the remaining 6 PRBs are for TB #2. In this example, 16QAM modulation will be used for both TBs, and Turbo ⅓ coding for both TBs will be utilized, with different rate matching according to the exact resource allocation to each TB. To determine the exact TB size (in uncoded bits as in LTE Rel-8), a similar LTE Rel-8 mechanism may be used, i.e., by reading a tabulated mapping between PRB number/MCS and TB size, the RN 4 will know the exact size for each TB. Note that for the backhaul link 3 no extensive look-up table needs to be introduced, instead some offset value can be introduce based upon a Rel-8 look-up table for TB size, which takes into account the potentially better link quality of the backhaul. Since a common modulation is used, while the effective coding rate is determined by resource allocation, there is no need to provide a MCS offset field for per each TB.

A simple example shows that the enhanced DCI can effectively reduce the backhaul control overhead (a 12.6% reduction in the example).

Number of PRBs in total for backhaul link:

$N\_PRB=25$

Number of symbols available for backhaul per PRB:

$N\_BH\_symbol=10$

Number of REs (resource elements) for backhaul:

$N\_RE\_total=N\_PRB*N\_BH\_symbol*12=3000$

Number of RNs:

$N\_RN=10$

Number of TBs per each RN:

$N\_TB=3$

Number of DCI bits assuming format 1 R-PDCCH per TB $N\_1=47*N\_TB*N\_RN=1410$ bits One R-PDCCH for Multiple_TB (CRC and Resource field compressed)

$N\_2\sim=83*N\_RN=830$ bits

Assuming a 16QAM ½ average backhaul efficiency, then:

|  | REs Control | REs data | TP data |
|---|---|---|---|
| R-PDCCH per TB | 705 | 2295 | 4590 |
| Multiple TB DCI | 415 | 2585 | 5170 |

In this non-limiting example it can be observed that the data throughput is increased by about 12.6%.

Note that this example assumes only 3 TB per RN 4, and no UL grant R-PDCCH overhead is considered. With the UL grant for multiple TBs the same concept applies and is equally beneficial.

Discussed now is the semi-static TB number configuration that is a further exemplary embodiment of this invention.

To reduce the RN 4 R-PDCCH searching complexity, higher layer signaling is introduced for TB number configuration. The signaling can either indicate the maximum TB number in a period of time, e.g., N_Max, or the exact number of TBs in a period of time, e.g., N_TB. For example, if N_Max is indicated via higher layer signaling, if N_Max=1, then the backhaul control can fall back to the Rel-8 mechanism, i.e., one R-PDCCH for the only TB, while if N_Max>1, then together with N_Max the DeNB 1 may also indicate to the RN 4 via higher layer signaling which R-PDCCH mode to monitor. For example, a first mode may be 'one R-PDCCH per each TB', while a second possible mode can be the enhanced DCI format which supports a maximum of N_Max TBs with only one R-PDCCH. In this case, the RN 4 need only monitor the configured mode so that the searching complexity is reduced. As described above, for the cases where N_Max>1, one R-PDCCH containing as many as N_Max TB-specific fields can always be used to avoid the need for the RN 4 to search over the different possible DCI formats for the different TB number.

The example in FIG. 4 takes the DCI format 1 in Rel-8 as one possible implementation, and shows how to form a DCI which can support multiple TBs. In practice, the following cases are also possible.

First, multiple TBs are allocated in the UL, so multiple R-PDCCHs for UL grant or a new DCI which supports multiple TB UL grant is needed. In this case, a new DCI format may be defined based on Rel-8 DCI format 0 (which is for UL grant).

Second, spatial multiplexing may be used for the backhaul 3, which implies more than one stream transmitted over the backhaul 3. In this case a new DCI format can be defined, based on Rel-8 DCI format 2, which is for spatial multiplexing cases.

For these examples, and possibly other cases as well, the exemplary enhanced DCI format can also apply.

Discussed now is the higher layer signaling and UL feedback signaling for handling the missing R-PDCCH, that is a further exemplary embodiment of this invention.

For those cases where the DeNB 1 transmits one R-PDCCH per each TB, the following can be performed to handle the R-PDCCH missing case. First, the DeNB 1 indicates a value for N_TB or N_Max via higher layer signaling. Then the RN 4 detects R-PDCCHs and indicates in UL feedback whether: a) a R-PDCCH was missed, b) a R-PDCCH was received, R-PDSCH ACK, or c) a R-PDCCH was received, R-PDSCH NACK. The RN 4 forms the ACK/NACK signaling according N_TB or N_Max as signaled by the DeNB 1.

For example, if the DeNB 1 configures for a certain period of time the maximum number of TBs to be 4 (or the exact number of TBs will be 4 with possibly some scheduling constraint), then 7 bits of signaling in the UL feedback is sufficient to provide the foregoing indications.

Basically, for a TB number N_TB, the number of UL feedback bits is given by:

$N\_UL=\text{round}(\log 2(\text{power}(N\_TB,3)))$.

In practice, the UL feedback bits may be protected by certain channel coding to ensure detection performance. Upon receiving the feedback bits the DeNB 1 will know which, if any, R-PDCCH was missed and can possibly reschedule the TB in later subframes.

Based on the foregoing it should be appreciated that the exemplary embodiments of this invention provide a number of advantages and technical effects in terms of multiple TB transmission over the backhaul link 3. For example, the use of these exemplary embodiments handles in an effective manner the missing R-PDCCH issue for those cases where one R-PDCCH is presented per each TB. Further by example, the use of these exemplary embodiments t significantly reduces control overhead over the backhaul link 3, which makes LTE relay system more efficient and robust.

Based on the foregoing it should be apparent that the exemplary embodiments of this invention provide a method, apparatus and computer program(s) to enhance backhaul link operation between a relay node and a base station or, more generally, a network access node (e.g., between the RN 4 and the DeNB 1 shown in FIG. 7).

FIG. 8 is a logic flow diagram that illustrates the operation of a method, and a result of execution of computer program instructions, in accordance with the exemplary embodiments of this invention. In accordance with these exemplary embodiments a method performs, at Block 8A, a step of composing downlink control information having a format configured to support a presence of a plurality of transport blocks in a single subframe, where the downlink control information comprises, for the plurality of transport blocks, a common resource allocation and modulation/coding scheme field and a single cyclic redundancy check field. At Block 8B there is a step of transmitting the composed downlink control information to a relay node over a wireless link that comprises a backhaul link from the relay node.

In the method as in FIG. 8, where the downlink control information further comprises a flag bits field to indicate the number of transport blocks included in a grant.

In the method as in FIG. 8, where the resource allocation of the downlink control information comprises a common resource grants field comprising a bitmap to indicate physical resource blocks allocated to the relay node.

In the method as in FIG. 8, where the modulation/coding scheme field comprises a baseline modulation/coding scheme field to indicate a modulation level and a coding scheme selected for the relay node in the subframe.

In the method as in FIG. 8, where the downlink control information further comprises transport block specific fields comprising hybrid automatic repeat request information for each transport block.

In the method as in the preceding paragraph, where the transport block specific fields further comprise a resource/modulation coding scheme offset value for each transport block for enabling the relay node to determine those resources among the total granted resources that are allocated to each transport block.

In the method as in FIG. 8, where a number of transport blocks supported by the downlink control information is set by higher layer signaling to the relay node to one of a maximum number during a period of time or a specific, exact number per period of time.

In the method as in the preceding paragraph, and further comprising, for a case where one relay physical downlink control channel per each transport block is transmitted to the relay node, receiving in uplink signaling from the relay node an indication of whether the relay physical downlink control channel was received by the relay node or was not received by the relay node.

In the method as in the preceding paragraph, where the indication that the relay physical downlink control channel was received by the relay node is sent in conjunction with a relay node physical uplink shared channel acknowledge or not acknowledge indication.

FIG. 9 is a logic flow diagram that illustrates the operation of a method, and a result of execution of computer program instructions, further in accordance with the exemplary embodiments of this invention. In accordance with these exemplary embodiments a method performs, at Block 9A, a step of receiving at a relay node downlink control information having a format configured to support a presence of a plurality of transport blocks in a single subframe, where the downlink control information comprises, for the plurality of transport blocks, a common resource allocation and modulation/coding scheme field and a single cyclic redundancy check field. At Block 9B there is a step of interpreting at the relay node the received downlink control information for use in transmitting at least user equipment data to a network access node over a backhaul wireless link.

The blocks shown in FIGS. 8 and 9 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) and LTE-A systems, it should be appreciated that the exemplary embodiments of this invention are not limited for use with only these particular types of wireless communication system, and that they may be used to advantage in other wireless communication systems that include a relay node capability.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., N_MAX, N_TB, etc.) are not intended to be limiting in any respect, as these parameters may be identified by any suitable names. Further, the various names assigned to different channels (e.g., R-PDCCH, R-PDSCH, etc.) and messages (e.g., DCI) are not intended to be limiting in any respect, as these various channels and messages may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   composing downlink control information having a format configured to support a presence of a plurality of transport blocks in a single subframe, wherein the downlink control information comprises, for the plurality of transport blocks, a common resource allocation field, a common modulation/coding scheme field, and a single cyclic redundancy check field, and wherein the downlink control information further comprises transport block specific fields comprising a resource/modulation coding scheme offset value for each transport block for enabling a relay node to determine those resources among the total granted resources that are allocated to each transport block based on the common resource allocation field and the resource/modulation coding scheme offset value, and enabling the relay node to determine the modulation/coding scheme allocated to each transport block based on the common modulation/coding scheme field and the resource/modulation coding scheme offset value; and
   transmitting the composed downlink control information to the relay node over a wireless link that comprises a backhaul link from the relay node.

2. The method as in claim 1, wherein the downlink control information further comprises a flag bits field to indicate the number of transport blocks included in a grant.

3. The method as in claim 1, wherein the resource allocation of the downlink control information comprises a common resource grants field comprising a bitmap to indicate physical resource blocks allocated to the relay node.

4. The method as in claim 1, wherein the modulation/coding scheme field comprises a baseline modulation/coding scheme field to indicate a modulation level and a coding scheme selected for the relay node in the subframe.

5. The method as in claim 1, wherein the transport block specific fields comprise hybrid automatic repeat request information for each transport block.

6. The method of claim 1, wherein a number of transport blocks supported by the downlink control information is set by higher layer signaling to the relay node to one of a maximum number during a period of time or a specific, exact number per period of time.

7. The method of claim 6, and further comprising, for a case where one relay physical downlink control channel per each transport block is transmitted to the relay node, receiving in uplink signaling from the relay node an indication of whether the relay physical downlink control channel was received by the relay node or was not received by the relay node.

8. The method of claim 7, wherein the indication that the relay physical downlink control channel was received by the relay node is sent in conjunction with a relay node physical uplink shared channel acknowledge or not acknowledge indication.

9. An apparatus comprising:
   a processor; and
   a memory including computer program code, where the memory and computer program code are configured, with the processor, to cause the apparatus to perform at least:
   composing downlink control information having a format configured to support a presence of a plurality of transport blocks in a single subframe, wherein the downlink control information comprises, for the plurality of transport blocks, a common resource allocation field, a common modulation/coding scheme field, and a single cyclic redundancy check field, and wherein the downlink control information further comprises transport block specific fields comprising a resource/modulation coding scheme offset value for each transport block for enabling a relay node to determine those resources among the total granted resources that are allocated to each transport block based on the common resource allocation field and the resource/modulation coding scheme offset value, and enabling the relay node to determine the modulation/coding scheme allocated to each transport block based on the common modulation/coding scheme field and the resource/modulation coding scheme offset value; and
   transmitting the composed downlink control information to the relay node over a wireless link that comprises a backhaul link from the relay node.

10. The apparatus as in claim 9, wherein the downlink control information further comprises a flag bits field to indicate the number of transport blocks included in a grant.

11. The apparatus as in claim 9, wherein the resource allocation of the downlink control information comprises a common resource grants field comprising a bitmap to indicate physical resource blocks allocated to the relay node.

12. The apparatus as in claim 9, wherein the modulation/coding scheme field comprises a baseline modulation/coding scheme field to indicate a modulation level and a coding scheme selected for the relay node in the subframe.

13. The apparatus as in claim 9, wherein the transport block specific fields comprise hybrid automatic repeat request information for each transport block.

14. The apparatus of claim 9, wherein a number of transport blocks supported by the downlink control information is set by higher layer signaling to the relay node to one of a maximum number during a period of time or a specific, exact number per period of time.

15. The apparatus of claim 14, and further comprising, for a case where one relay physical downlink control channel per each transport block is transmitted to the relay node, receiving in uplink signaling from the relay node an indication of whether the relay physical downlink control channel was received by the relay node or was not received by the relay node.

16. The apparatus of claim 15, wherein the indication that the relay physical downlink control channel was received by the relay node is sent in conjunction with a relay node physical uplink shared channel acknowledge or not acknowledge indication.

17. A method comprising:
receiving at a relay node downlink control information having a format configured to support a presence of a plurality of transport blocks in a single subframe, wherein the downlink control information comprises, for the plurality of transport blocks, a common resource allocation field, a common modulation/coding scheme field, and a single cyclic redundancy check field, and wherein the downlink control information further comprises transport block specific fields comprising a resource/modulation coding scheme offset value for each transport block for enabling a relay node to determine those resources among the total granted resources that are allocated to each transport block based on the common resource allocation field and the resource/modulation coding scheme offset value, and enabling the relay node to determine the modulation/coding scheme allocated to each transport block based on the common modulation/coding scheme field and the resource/modulation coding scheme offset value; and
interpreting at the relay node the received downlink control information for use in transmitting at least user equipment data to a network access node over a backhaul wireless link.

\* \* \* \* \*